United States Patent [19]

Farone

[11] 4,009,131
[45] Feb. 22, 1977

[54] POWDER COATING COMPOSITIONS AND METAL OBJECTS COATED THEREWITH

[75] Inventor: Eugene Richard Farone, Mentor, Ohio

[73] Assignee: The Lubrizol Corporation, Cleveland, Ohio

[22] Filed: Oct. 2, 1972

[21] Appl. No.: 293,872

Related U.S. Application Data

[63] Continuation-in-part of Ser. No. 218,576, Jan. 17, 1972, abandoned.

[52] U.S. Cl. .................... 260/23 R; 252/8.5 C; 260/31.8 R; 260/42.43; 427/27; 427/195
[51] Int. Cl.² .................................. C08L 91/00
[58] Field of Search .......... 260/23 R, 31.8 R, 40 R, 260/835, 31.8 XA, 42.43; 252/8.5 C; 526/319, 320

[56] References Cited

UNITED STATES PATENTS

| | | | |
|---|---|---|---|
| 3,166,524 | 1/1965 | Schmidle | 260/23 R |
| 3,317,635 | 5/1967 | Osmond et al. | 260/23 R |
| 3,492,253 | 1/1970 | Katz et al. | 260/23 R |
| 3,770,848 | 11/1973 | Labana | 260/835 |

*Primary Examiner*—Melvyn I. Marquis
*Assistant Examiner*—W. E. Parker
*Attorney, Agent, or Firm*—James W. Adams, Jr.; William H. Pittman

[57] ABSTRACT

Solid compositions comprising (A) a solid addition polymer containing units derived from at least one of acrylic or methacrylic acids and esters threof and from at least one epoxyalkyl ester or ether, and (B) aliphatic polycarboxylic acids (either monomeric or polymeric) having a first acidic dissociation constant no greater than $10^{-3}$, optionally in combination with a pigment and other known additives, are useful for coating metal surfaces, preferably by electrostatic powder coating methods. The coatings produced from these compositions are suitable as automobile body and wheel coatings.

8 Claims, No Drawings

POWDER COATING COMPOSITIONS AND METAL OBJECTS COATED THEREWITH

This application is a continuation-in-part of copending application Ser. No. 218,576, filed Jan. 17, 1972 and now abandoned.

This invention relates to polymeric compositions of matter suitable for use in powder coating processes, and to methods for the coating of objects, principally metal objects, therewith. More particularly, it relates to solid, particulate compositions of matter comprising:

A. a solid addition polymer containing a substantial proportion of units derived from at least one of acrylic and methacrylic acids and esters thereof and at least about 5% by weight of units derived from at least one polymerizable, unsaturated epoxyalkyl ester or ether; and B. in combination therewith, at least one compound containing a plurality of aliphatic carboxylic acid groups separated by intervening structure which includes straight chains of 2-30 atoms, said compound having a first acidic dissociation constant no greater than $10^{-3}$.

Methods of coating which involve the use of a solid, particulate coating composition have had increasing use in recent years. Two such methods are prominent. In one, the object to be coated is submerged in a fluidized bed of the powdered coating composition, usually with prior heating of said object to a temperature above the sintering point of the coating material. As the material contacts the heated surface, it fuses thereon to form a smooth coating.

In the second method, an electrostatic charge is imparted to the powdered coating composition which is then sprayed onto the article being coated; the latter is grounded or a charge of opposite polarity is applied thereto, or, if it is non-conductive, said charge may be applied to an electrode on the opposite side thereof. The coating material is subsequently fused on the object, by heating, to form a continuous coating.

The powder coating technology, especially in electrostatic coating, has recently become sophisticated enough so that it is now being considered for the application of coatings (usually pigmented) to automobile bodies and wheels. The coatings produced on such bodies and wheels must, of course, be singularly tough, resistant to severe physical and atmospheric conditions, and attractive to the eye. Therefore, such surface defects as cracking, checking, pinholing, flaking, chipping and the like must be eliminated entirely, and the coating composition prior to application must have an extremely small particle size and must be freeflowing and not subject to agglomeration.

A principal object of the present invention, therefore, is to provide improved polymeric compositions suitable for use in fluidized bed or electrostatic powder coating operations.

A further object is to provide powder coating compositions which form extremely tough, durable and attractive finishes for metal surfaces.

Another object is to provide powder coating compositions which are suitable for coating automotive bodies and wheels.

A still further object is to provide a suitable process for applying solid, particulate coatings to metal surfaces such as automobile bodies and wheels.

Other objects will in part be obvious and will in part appear hereinafter.

The coating compositions of this invention contain two essential constituents identified as components A and B respectively. A number of optional ingredients are further described hereinafter; many of these are present in the preferred compositions by virtue of the improved properties they impart either to the powdered coating composition or to the coating prepared therefrom.

Component A is a solid addition polymer derived, at least in part, from at least one of acrylic or methacrylic acid and esters thereof (hereinafter sometimes referred to as "acrylic compounds") and in part from a polymerizable epoxyalkyl ester or ether. The units derived from acrylic compounds comprise a substantial proportion of the polymer, generally at least about 10% by weight. In the case of polymers to be used in compositions for coating automobile bodies and wheels, and in other applications in which they must withstand similar severe conditions, at least about 70% by weight of acrylic units should be present. In most instances, all of the acrylic units will be ester units, typically derived from alkyl esters in which the alkyl radicals contain no more than 8 carbon atoms. Examples of such esters are the methyl, ethyl, n-butyl, isobutyl, n-hexyl, isohexyl and 2-ethylhexyl esters of acrylic and methacrylic acid. However, the present invention also includes polymers containing free acrylic or methacrylic acid groups, and such polymers are generally self-curing; that is, components A and B may be the same, as described hereinafter.

It is critical that component A conain at least 5% of units derived from a polymerizable, unsaturated epoxyalkyl ester or ether. Usually, it contains at least about 5–25% of such units. The epoxyalkyl units may be derived from such ethers as allyl glycidyl ether, or such esters as glycidyl acrylate and methacrylate. The latter are classed as acrylic compounds and so such units are also within the "at least 10%" previously described with reference to acrylic units.

The polymer used as component A may also contain units derived from other monomers such as: (1) esters of unsaturated alcohols, e.g., allyl and cinnamyl alcohol, with saturated acids (e.g., acetic or propionic), polybasic acids such as oxalic or succinic, or unsaturated polybasic acids such as maleic or fumaric; (2) vinyl aromatic compounds such as styrene or vinyltoluene; (3) unsaturated ethers such as methyl vinyl ether; (4) unsaturated ketones such as methyl vinyl ketone; (5) unsaturated amides, e.g., acrylamide, methacrylamide and diacetone acrylamide; (6) unsaturated aliphatic hydrocarbons such as ethylene and propylene; (7) vinyl halides, particularly vinyl chloride; and (8) nitriles such as acrylonitrile and methacrylonitrile. Particularly preferred are units derived from vinyl aromatic hydrocarbons, especially styrene.

Polymers especially suitable for use as component A are interpolymers of glycidyl esters of acrylic or methacrylic acid, one or more lower alkyl esters thereof, and styrene. Typical polymers of this type may contain about 10–20% by weight of units derived from the glycidyl ester and about 10–25% of units derived from styrene, with the remainder being alkyl acrylate or methacrylate units.

The polymer may be prepared by any suitable method. Typically, it is prepared in solution or in aqueous emulsion or suspension and is then dried to form the desired solid powder. The drying may be accomplished by filtration (in the case of suspension polymers); by stripping, typically vacuum stripping and especially vacuum drum stripping; by spray drying; or by other appropriate methods. It is frequently advantageous to admix the solution or emulsion polymer with one or more other constituents of the final coating composition before drying. Alternatively, such ingredients may be added during the final blending operation after the polymer is dried, as described hereinafter.

The molecular weight of the polymer used as component A is usually below about 50,000 (number average) and preferably about 1,500–20,000. The use of a chain transfer agent during polymerization may aid in the preparation of a polymer having a molecular weight within this range. Mercaptans are preferred as chain transfer agents; those having at least about 10 carbon atoms, especially tertiary mercaptans, also increase storage stability of the compositions.

Component B of the composition of this invention is a polycarboxylic acid reagent in which the acid groups are separated by intervening structure including straight chains (which may, however, contain branching) of 2–30 atoms. Two classes of polycarboxylic acids are generally useful. The first comprises polymeric acids, typically polymers of acrylic acid, methacrylic acid and the like. The most useful of said polymers are copolymers wherein the other monomeric units are derived from the alkyl esters described above with reference to component A, and are present in approximately the same proportions. It is also possible for components A and B to be the same polymer, containing both epoxyalkyl and acid units, which polymer will be self-curing.

The second class of acids comprises non-polymeric polycarboxylic acids such as succinic, glutaric, adipic, pimelic, sebacic, azelaic, suberic and citric acids; partial esters thereof with polyhydric alcohols such as ethylene glycol, trimethylene glycol, propylene glycol, 1,4-butanediol and the like; and mixtures of said acids and partial esters. Especially useful are dibasic acids or mixtures thereof, wherein the carboxylic acid groups are separated by straight chains of about 7–25 carbon and oxygen atoms, particularly simple dicarboxylic acids having about 7–10 carbon atoms, preferably sebacic acid; acidic bis-alkylene esters thereof containing straight chains of about 20–25 carbon atoms, preferably ethylene 1,2-bis(hydrogen sebacate); and mixtures of said acids and acidic esters.

Compositions containing these non-polymeric polycarboxylic acids are not part of this invention. They are disclosed and claimed in copending applications Ser. No. 218,577, filed Jan. 17, 1972, and Ser. No. 293,871, filed Oct. 2, 1972. Those applications also contain disclosures, derived from me, of the compositions described hereinabove containing polymeric acids.

It is critical that component B have a first acidic dissociation constant no greater than $10^{-3}$. If it is greater, the composition will not "flow out" properly on the surface being coated before curing, and the result will be a rough, uneven coating. Preferably, the dissociation constant is no greater than $10^{-4}$.

In addition to components A and B described above, the compositions of this invention will ordinarily contain pigments and may also contain additional polymeric ingredients to improve the quality of the final coating by eliminating pinholing, checking and the like. Particularly suitable for this purpose are polymers of higher alkyl (e.g. $C_{12-20}$) acrylates and methacrylates. Many of these are commercially available. Cellulose-baed resins such as cellulose acetate butyrate are also sometimes effective. Other special purpose constituents such as anti-oxidants, light stabilizers, anticaking agents and the like may also be present.

The pigments useful in these compositions may be either organic or inorganic and their nature and properties are well known to those skilled in the powder coating and automotive finish art. An extended discussion of these pigments is believed unnecessary.

The compositions of this invention usually contain about 50–75 parts by weight of component A and about 5–15 parts of component B. The pigment, when present, usually comprises about 15–30 parts. Other ingredients are usually present in very small amounts, usually about 0.1–2.0 parts.

When component B is a mixture of a simple dicarboxylic acid with a bis(alkylene glycol) ester thereof, the weight proportion of simple acid to ester is generally between about 2:1 and 1:2, preferably between 1:1 and 1:2.

In the following table are listed typical powder coating compositions according to this invention. The material referred to as "Polymer I" is formed by polymerization in ethanol solution of 15 parts of glycidyl methacrylate, 23 parts of butyl acrylate, 44 parts of methyl methacrylate and 18 parts of styrene, using an azobisisobutyronitrile initiator and a t-dodecyl mercaptan chain transfer agent. Polymer II is prepared similarly from 10 parts of acrylic acid, 28.5 parts of butyl acrylate, 47.5 parts of methyl methacrylate and 14 parts of styrene, and is subsequently precipitated with water and dried. In Examples 1, 2, 4 and 5, Polymer I is spray-dried after preparation and subsequently blended with the other constituents. In Example 3, the solution of Polymer I is blended with the other constituents and the entire composition is subsequently spray-dried.

| Example | Parts by weight | | | | |
|---|---|---|---|---|---|
| | 1 | 2 | 3 | 4 | 5 |
| Polymer I | 67 | 66.2 | 66.2 | 66.2 | 40.6 |
| Polymer II | — | — | — | — | 34.5 |
| Sebacic acid | 6 | 3.17 | 3.17 | 3.17 | — |
| Ethylene 1,2-bis(hydrogen sebacate) | — | 5.04 | 5.04 | 5.04 | — |
| "Defoamer PC-1344" (approx. $C_{16}$ alkyl polyacrylate) | — | 0.5 | 0.5 | 0.5 | — |
| Cellulose acetate butyrate | 2 | — | — | — | — |
| Titanium dioxide | 25 | 24.4 | 24.4 | 24.4 | 24.9 |
| "Ghromatherm Yellow "YC-2030" pigment | 0.5 | 0.65 | 0.65 | 0.65 | — |
| "Petro AG" anti-caking agent | — | — | — | 0.05 | — |

As previously mentioned, the compositions of this invention are useful for coating surfaces of various kinds by powder coating techniques. They are particularly useful for coating metallic surfaces, especially automobile bodies and wheels. Coatings on such surfaces are formed by known methods, the techniques generally comprising contacting the surface of the object being coated with the composition of this invention, adhering the particles of said composition to said surface by electrostatic attraction, and subsequently curing and fusing said composition by heating to a temperature high enough to effect curing and form a continuous thermoset coating on said surface.

The means for contacting the metal surface with the composition of this invention is generally by spraying, with the particles receiving an electrostatic charge prior to the spraying operation. The metal surface being coated may receive a charge of opposite polarity, but is generally merely grounded. After the coating operation has been completed, the coated metal article is passed through a heating stage, where it is heated to about 125°–250° C. At this temperature, component B reacts with component A to form a cured or crosslinked thermoset composition which covers the entire metal surface smoothly and evenly. This composition has been found to have the durability and attractive appearance necessary for automobile topcoats.

What is claimed is:

1. A solid, particulate composition of matter comprising:
    A. a solid addition polymer containing a substantial proportion of units derived from at least one of acrylic and methacrylic acids and esters thereof and at least about 5% by weight of units derived from at least one polymerizable, unsaturated epoxyalkyl ester or ether; and
    B. in combination therewith, at least one polymer containing a plurality of aliphatic carboxylic acid groups separated by intervening structure which includes straight chains of 2–30 carbon atoms, said polymer having a first acidic dissociation constant no greater than $10^{-3}$.

2. A composition according to claim 1 wherein component A contains at least about 70% by weight of units derived from acrylic and methacrylic acids and esters thereof, including about 5–25% of units derived from an epoxyalkyl ester thereof.

3. A composition according to claim 2 wherein component B is a polymer containing units derived from acrylic or methacrylic acid and having a first acidic dissociation constant no greater than $10^{-4}$.

4. A composition according to claim 3 wherein component A is an interpolymer of at least one glycidyl ester of acrylic or methacrylic acid, one or more alkyl esters of acrylic or methacrylic acid wherein the alkyl group contains no more than 8 carbon atoms, and styrene.

5. A composition according to claim 4 wherein component A contains about 10–20% of units derived from said glycidyl ester and about 10–25% of units derived from styrene, the remainder being alkyl acrylate or methacrylate units.

6. A composition according to claim 5 which comprises about 50–75 parts by weight of component A and about 5–15 parts of component B.

7. A composition according to claim 6 which additionally contains about 15–30 parts by weight of a pigment.

8. A composition according to claim 7 wherein component A is an interpolymer of glycidyl methacrylate, butyl acrylate, methyl methacrylate and styrene having a number average molecular weight below about 50,000.

* * * * *